Jan. 9, 1951  J. W. FOLEY  2,537,578
DISK ROLLER BEARING
Filed June 15, 1946  2 Sheets-Sheet 1
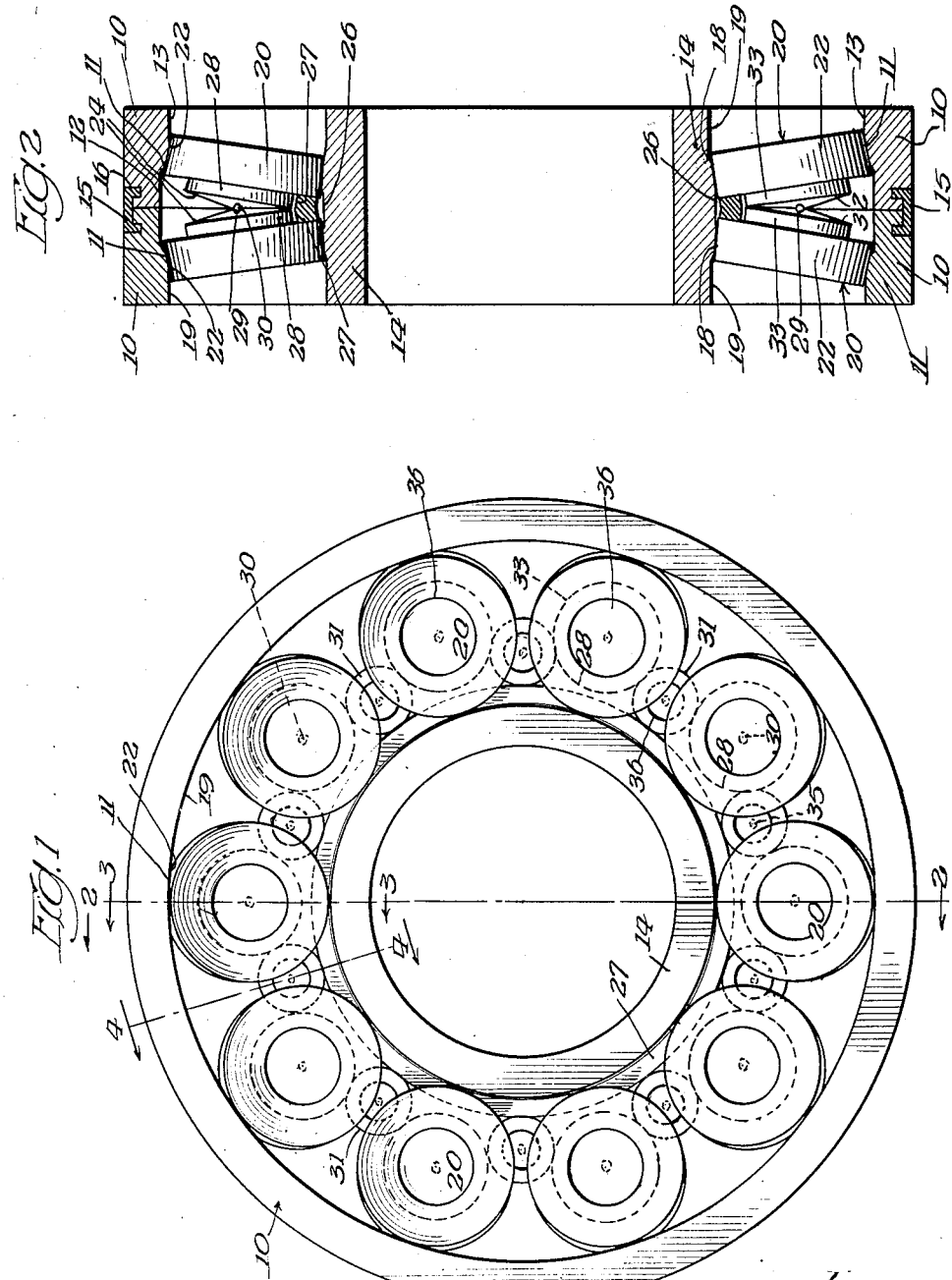
Inventor:
John W. Foley
By [signature]
Atty.

Jan. 9, 1951  J. W. FOLEY  2,537,578
DISK ROLLER BEARING
Filed June 15, 1946  2 Sheets-Sheet 2
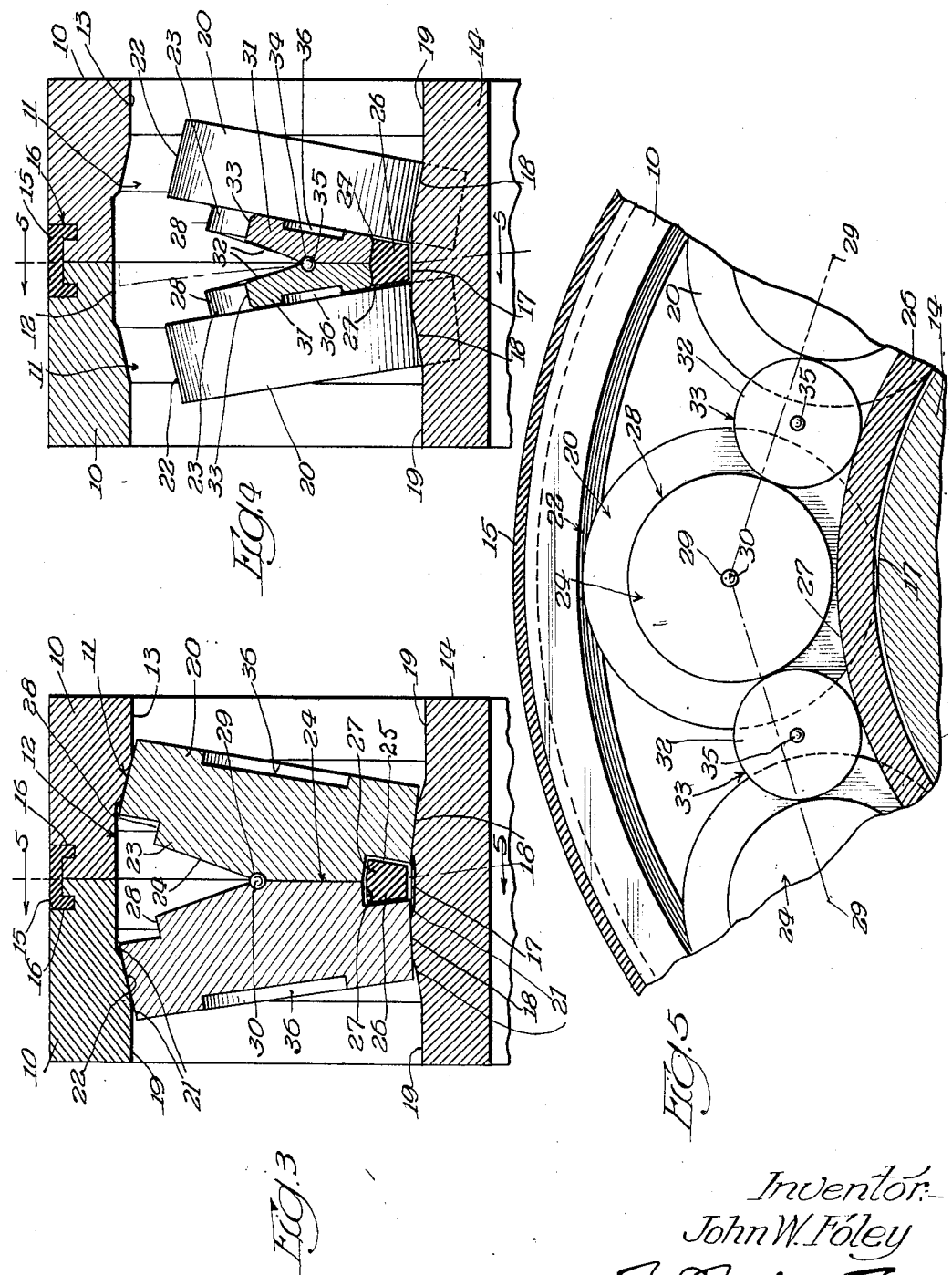
Inventor:
John W. Foley
By:

Patented Jan. 9, 1951

2,537,578

UNITED STATES PATENT OFFICE 2,537,578

DISK ROLLER BEARING

John W. Foley, Chicago, Ill.

Application June 15, 1946, Serial No. 676,950

13 Claims. (Cl. 308—206)

This invention relates to improvements in disc roller bearing, in which the rollers are in the form of discs that are provided with a conical lateral face, the faces of opposite rollers contacting and rolling against each other. Disposed between adjacent rollers are smaller rollers, which are also in the form of discs having a conical lateral face, and which conical faces also have rolling contact with each other. All of the rollers are disposed to rotate about inclined axes, so that the co-operating pairs of disc rollers are inclined away from each other, while the contacting portions of the conical surfaces will be disposed substantially vertical when the bearing is held uprightly or on edge.

A further object is to provide an improved bearing of this character, in which the number of parts is reduced to a minimum.

To the attainment of these ends and the accomplishment of other new and useful objects as will appear, the invention consists in the features of novelty in substantially the construction, combination and arrangement of the several parts, hereinafter more fully described and claimed, and shown in the accompanying drawings exemplifying this invention, in which Fig. 1 is a side elevational view of a bearing of this character, constructed in accordance with the principles of this invention.

Fig. 2 is a sectional view taken on line 2—2, Fig. 1.

Fig. 3 is a detail sectional view taken on line 3—3, Fig. 1, on an enlarged scale.

Fig. 4 is a detail sectional view taken on line 4—4, Fig. 1, on an enlarged scale.

Fig. 5 is a sectional view taken on line 5—5, Figs. 3 and 4.

The bearing consists essentially of an outer ring and an inner ring. The outer ring 10 is preferably constructed of two members, each of which is provided with an inclined bearing surface 11, and these surfaces terminate short of each other adjacent the longitudinal center of the member, to provide a space or surface 12, between the inner edges of the inclined surfaces. The outer edges of the surfaces 11 also terminate considerably short of the outer lateral faces of the respective members 10, to provide a straight surface 13.

The inner ring 14 may be formed of a single piece of material, or may be of a sectional construction suitably secured together. The external diameter of the inner ring is considerably less than the inner diameter of the outer ring, to provide a space therebetween, in which the roller discs are arranged. The sections of the outer ring 10 abut each other, and may be secured together in any suitable manner, preferably by a channel-shaped member 15 of ductile material seated in recesses 16, which latter open through the outer periphery of the ring members.

The outer periphery of the inner ring 14, adjacent its longitudinal center, is shaped to provide a flat surface 17 which may be of any desired width, and adjacent and on opposite sides of such surface, is shaped to form inclined bearing surfaces 18, of suitable width, which merge at their lower sides into flat surfaces 19, the inclined surfaces terminating a substantial distance from the respective lateral faces of the ring member.

The inclined surfaces 11 and 18 are opposed to each other, and are disposed on angles described from a common point spaced laterally from the members 10 and 14, and in alinement with the axial center of the bearing.

Between the co-operating bearing surfaces 11 and 18, and on each side of the center of the bearing, are rollers in the form of discs 20, having flat peripheries. The discs are of a thickness to provide substantial bearing surfaces, the periphery of the rollers being flat, to form the area that contacts the inclined surfaces 11 and 18, respectively, of the outer and inner rings 10, 14. These surfaces or portions 11 and 18 are shaped beyond the roller contacting point, to form a clearance space.

With this construction, the edges will not only be free from contact with the ring bearing surfaces 11 and 18, but sufficient material will be provided at the edges of the discs, and on each side of the bearing surface, to maintain such edges from breaking down or wearing away.

The inner lateral faces of the discs are reduced in diameter, as at 23, to form hub portions and the face of such reduced or hub portion of each roller is shaped to form an inclined or conical surface 24. As the discs 20 are disposed at an angle, or incline to the vertical and to each other, and as the peripheries of the discs contact the bearing surfaces 11—18, respectively, on the outer and inner ring members, portions of the conical surfaces of opposite discs will contact each other, as shown in Fig. 3, so that they will roll against each other as they rotate about their respective axes. The conically ended hub portions 23 of the discs are of a diameter considerably less than the diameter of the body of the discs, so that there will be formed a space or recess 25 adjacent the contacting portions of the conical surfaces, and within this recess is arranged a floating inner bearing ring 26. The periphery of this ring is inclined from the center, laterally, as at 27, and the periphery of this ring has contact with the periphery of the hub portion 33 of the discs 31. The apex of the conical surfaces 24 may, if desired, be recessed or shaped, as at 29, to form a bearing or seat for a ball 30.

Disposed between the discs 20 are similarly shaped smaller discs, each of which embodies a disc-shaped body 31, having one of its lateral faces shaped or reduced to form a hub having a conical surface 32, and the peripheries of the hub portion 33 contact the periphery of the floating inner bearing ring 26. The peripheries 33 of the hub portion of the discs or rollers 31 contact the inclined periphery 27 of the floating ring 26. The inner diameter of the ring 26 is greater than the external diameter of the inner ring 14, so as to be maintained out of contact with the latter.

These smaller discs or rollers 31 are also disposed on an angle, or are inclined to the vertical, so that portions of the conical surfaces of opposite discs will contact and roll against each other. The apex of each conical surface 32 is recessed, as at 34, so that a ball 35 may be disposed between the proximate discs 31, for the purpose of keeping these discs alined and causing them to roll together.

The discs 31 are of a cross-sectional diameter greater than the space between adjacent discs 20, and are disposed so that the centers of the discs 31 will be in a lower plane (Fig. 5) than the plane of the apices of the conical surfaces 24 of the discs 20, so that, when rotating, the discs 31 will not drop or fall out of position. Furthermore, the smaller discs 31 will support and maintain the larger discs 20 out of contact with the floating inner ring 26.

The discs may be provided with a recess 36, by means of which the discs may be held by a suitable tool for shaping and finishing the discs.

The rollers of each series which have direct rolling contact with each other, are slightly tapered and of the same angles, and radiate from the same center, spaced laterally from the bearing, and in alinement with the diametric center of the bearing. That is, the thrust bearing peripheries of the discs are slightly greater at their inner ends than at their outer ends.

The angle of inclination of the side or periphery of the extension 28 on the larger discs, is the same as the angle of inclination of the side or periphery of the conical extension of the smaller roller 31, so that there will be no slippage between these parts, and thereby heating thereof will be avoided.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A bearing of the character described, embodying an outer and an inner ring, rollers adapted to roll between said rings and arranged in pairs between the rings, the roller contacting surfaces on said rings being inclined with respect to the axis of the rings, said rollers each embodying a disc and a hub of reduced diameter projecting from the disc, the proximate faces of the hubs in the rollers of each pair being of conical formation, said conical faces engaging and rolling against each other, a floating ring encompassed by said hubs, and additional rollers supported by said floating ring and contacting the periphery of said hubs.

2. A bearing of the character described, embodying an outer and an inner ring, rollers adapted to roll between said rings and arranged in pairs between the rings, the roller contacting surfaces on said rings being inclined with respect to the axis of the rings, said rollers each embodying a disc and a hub of reduced diameter projecting from the disc, the proximate faces of the hubs of the rollers in each pair being of conical formation, said conical faces engaging and rolling against each other, a floating ring encompassed by said hubs, and additional rollers supported by said floating ring, disposed between the first said rollers and contacting the periphery of said hubs, whereby to assist in supporting said rollers and for maintaining them out of contact with said floating ring.

3. A bearing of the character described, embodying an outer and an inner ring, rollers adapted to roll between said rings and arranged in pairs between the rings, the roller contacting surfaces on said rings being inclined with respect to the axis of the rings, said rollers each embodying a disc and a hub of reduced diameter projecting from the disc, the proximate faces of the hubs of the rollers in each pair being of conical formation, said conical faces engaging and rolling against each other, a floating ring encompassed by said hubs, and additional rollers supported by said floating ring and arranged in pairs on the periphery of said ring, said additional rollers contacting the periphery of said hubs, the last said rollers each embodying a disc-shaped body portion and a conical lateral face, the said conical faces of the additional rollers in each pair having rolling contact with each other.

4. A bearing of the character described, embodying an outer and an inner ring, rollers adapted to roll between said rings and arranged in pairs between the rings, the roller contacting surfaces on said rings being inclined with respect to the axis of the rings, said rollers each embodying a disc and a hub of reduced diameter projecting from the disc, the proximate faces of the hubs of the rollers in each pair being of conical formation, said conical faces engaging and rolling against each other, a ball bearing seated in the apices of each pair of co-operating rollers, a floating ring encompassed by said hubs, and additional rollers supported by said floating ring and contacting the periphery of said hubs.

5. A bearing of the character described, embodying an outer and an inner ring, rollers adapted to roll between said rings and arranged in pairs between the rings, the roller contacting surfaces on said rings being inclined with respect to the axis of the rings, said rollers each embodying a disc and a hub of reduced diameter projecting from the disc, the proximate faces of the hubs of the rollers in each pair being of conical formation, said conical faces engaging and rolling against each other, a floating ring encompassed by said hubs, and additional rollers supported by said floating ring and contacting the periphery of said hubs, the width of the periphery of said discs that engage said roller contacting surfaces being greater than the width of such contacting surfaces.

6. A bearing of the character described, embodying an outer and an inner ring, rollers adapted to roll between said rings and arranged in pairs between the rings, the roller contacting surfaces on said rings being inclined with respect to the axis of the rings, said rollers each embodying a disc and a hub of reduced diameter projecting from the disc, the proximate faces of the hubs of the rollers in each pair being of conical formation, said conical faces engaging and rolling against each other, a floating ring encompassed by said hubs, and additional rollers supported by said floating ring and contacting the periphery of said hubs, the width of the periphery of said discs that engage said roller contacting surfaces being greater than the width of such contacting surfaces, the lateral portions of the periphery of each disc beyond said bearing surfaces being slightly tapered.

7. A bearing of the character described, embodying an outer and an inner ring, rollers disposed between and having peripheral contact with said rings, the proximate faces of rollers of co-operating pairs of rollers being of conical formation and having rolling contact with each other, and an additional series of rollers of smaller diameter disposed between adjacent rollers of the first said rollers, the co-operating rollers of said additional rollers also having conically shaped faces having rolling contact with each other.

8. A bearing of the character described, embodying an outer and an inner ring, a series of rollers disposed between and having peripheral contact with said rings, the proximate faces of rollers of co-operating pairs of rollers being of conical formation and having rolling contact with each other, a series of additional rollers of smaller diameter disposed between adjacent rollers of the first said series of rollers, the co-operating rollers of said additional series of rollers also having conically shaped faces having rolling contact with each other, and a floating ring constituting a supporting bearing for said additional rollers.

9. A bearing of the character described, embodying an outer and an inner ring, a series of rollers disposed between and having peripheral contact with said rings, the proximate faces of rollers of co-operating pairs of rollers being of conical formation and having rolling contact with each other, and an additional series of rollers of smaller diameter disposed between adjacent rollers of the first said series of rollers, the co-operating rollers of said additional series of rollers also having conically shaped faces having rolling contact with each other, the axes of all of the rollers being inclined to the axis of the bearing.

10. A bearing of the character described, embodying an outer and an inner ring, a series of rollers disposed between and having peripheral contact with said rings, the proximate faces of rollers of co-operating pairs of rollers being of conical formation and having rolling contact with each other, an additional series of rollers of smaller diameter disposed between adjacent rollers of the first said rollers, the co-operating rollers of said additional series of rollers also having conically shaped faces having rolling contact with each other, the axes of all of the rollers of both series being inclined to the axis of the bearing, and a roller bearing element disposed between the apices of the conical portions of co-operating pairs of rollers.

11. A roller bearing embodying an inner and an outer ring, the roller contacting surfaces on said rings being inclined downwardly with respect to the axis of the rings, in directions from the center towards the ends thereof, the proximate faces of co-operating rollers being reduced to form hub portions, the outer ends of which hub portions are shaped to form conical bearing surfaces, engaging and rolling against each other, a floating ring encompassed by said hub portions, and rollers supported by said floating ring and contacting the periphery of said hub portions.

12. A roller bearing embodying an inner and an outer ring, the roller contacting surfaces on said rings being inclined downwardly with respect to the axis of the rings, in direction from the center towards the ends thereof, the proximate faces of co-operating rollers being reduced to form hub portions, the outer ends of which hub portions are shaped to form conical bearing surfaces, engaging and rolling against each other, a floating ring encompassed by said hub portions, and rollers supported by said floating ring and contacting the periphery of said hub portions, said floating ring being disposed within the confines of the periphery of said rollers.

13. A roller bearing embodying an inner and an outer ring, the roller contacting surfaces on said rings being inclined downwardly with respect to the axis of the rings, in directions from the center towards the ends thereof, the proximate faces of co-operating rollers being reduced to form hub portions, the outer ends of which hub portions are shaped to form conical bearing surfaces, engaging and rolling against each other, a floating ring encompassed by said hub portions, and rollers supported by said floating ring and contacting the periphery of said hub portions, the last said rollers having lateral conically shaped surfaces having rolling contact with the co-operating oppositely disposed roller.

JOHN W. FOLEY.

REFERENCES CITED

The following references are of record in the file of this patent:

UNITED STATES PATENTS

| Number | Name | Date |
|---|---|---|
| 703,405 | Griffin | July 1, 1902 |
| 1,418,277 | Birgh | June 6, 1922 |
| 2,089,048 | Bachman | Aug. 3, 1937 |